United States Patent [19]

Chauveau

[11] Patent Number: 5,152,212
[45] Date of Patent: Oct. 6, 1992

[54] REACTION VESSEL FOR PROCESSING A SOLUTION OF COCOA AND THE DERIVATIVES THEREOF

[75] Inventor: Jean-Marie Chauveau, Gorgier, Switzerland

[73] Assignee: SERVCO S.p.A., Italy

[21] Appl. No.: 721,580

[22] PCT Filed: Nov. 16, 1990

[86] PCT No.: PCT/CH90/00263
§ 371 Date: Jul. 17, 1991
§ 102(e) Date: Jul. 17, 1991

[87] PCT Pub. No.: WO91/07099
PCT Pub. Date: May 30, 1991

[30] Foreign Application Priority Data

Nov. 20, 1989 [FR] France ............... 89 15385

[51] Int. Cl.⁵ ............ A23G 1/00; A23G 1/04; B01F 7/16
[52] U.S. Cl. ................ 99/348; 99/455; 99/470; 99/472; 99/483; 366/104; 366/136; 366/139; 366/144; 366/153
[58] Field of Search ........... 99/348, 452, 453, 454, 99/455, 460, 470, 472, 474, 483, 485, 493, 516, 534, 473; 366/139, 101–104, 144, 136, 145, 137, 146, 153; 426/631, 447, 456

[56] References Cited

U.S. PATENT DOCUMENTS

| | | | |
|---|---|---|---|
| 3,634,106 | 1/1972 | Organ et al. | 99/485 |
| 3,739,711 | 6/1973 | Nieblach | 99/348 |
| 3,754,466 | 8/1973 | Taralli et al. | 99/472 |
| 3,778,519 | 12/1973 | Taralli et al. | 99/472 |
| 3,868,469 | 2/1975 | Chalin | 99/516 |
| 3,955,489 | 5/1976 | Goerling et al. | 99/485 |
| 4,267,703 | 5/1981 | Minifie et al. | 99/348 |
| 4,349,579 | 9/1982 | Raboud et al. | 99/534 |
| 4,357,111 | 11/1982 | Honemeyer et al. | 366/45 |
| 4,628,803 | 12/1986 | Bonora et al. | 366/139 |

FOREIGN PATENT DOCUMENTS

| | | |
|---|---|---|
| 0178349 | 4/1986 | European Pat. Off. |
| 3112994 | 7/1982 | Fed. Rep. of Germany |
| 3905110 | 9/1989 | Fed. Rep. of Germany ...... 366/139 |

*Primary Examiner*—Timothy F. Simone
*Attorney, Agent, or Firm*—Davis, Bujold & Streck

[57] ABSTRACT

An autoclave-type reaction vessel has a mechanism for stirring and recirculating the cocoa solution, the mechanism having a greater mechanical performance which allows for an increase in the efficiency of the various processing steps, in particular via an increase in the water content of the solution. In a closed vat (1), stirring elements (32 to 35) are mounted on a hollow rotatable shaft (6) driven by a back-geared motor (7). Some of the solution is drawn off at the bottom of the vat by an external pump (36) which delivers it up the inside of the hollow shaft (6) to a spraying head (41). Processing fluids (48, 49) such as neutral gases and alkaline solutions may be added to the solution before it reaches the pump (36).

14 Claims, 2 Drawing Sheets

REACTION VESSEL FOR PROCESSING A SOLUTION OF COCOA AND THE DERIVATIVES THEREOF

The present invention concerns a reaction vessel for treating a solution of cocoa and its derivatives, comprising:
- a closed vat with at least one inlet and one outlet for said solution, designed to maintain the solution below a pre-determined maximum level;
- means for heating said solution;
- at least one vacuum connection connecting the vat to a vacuum pump;
- means for introducing treatment fluids into the vat;
- stirring means comprising a rotatable shaft extending vertically in the vat, stirring means attached to said shaft and drive means connected to said shaft; and
- circulation means comprising at least one pump and a spray device fed by said pump, the pump drawing off solution from the base of the vat and the spray device being designed to project this solution into an upper portion of the vat, above said maximum level.

Such a reaction vessel is designed to perform one or preferably more than one of the following treatments on a solution containing cocoa and/or similar products such as hazelnut or almond pastes, etc.:
- pasteurization;
- sterilization;
- de-acidification;
- alkalizing, especially by addition of potassium;
- Maillar reaction development of a supplementary aromatic phase by adding amino acids and reduced sugars;
- torrefaction in the liquid phase;
- completion of the chocolate.

BACKGROUND OF THE INVENTION

Patent Application No. DE-A-3 112 994 describes a reaction vessel of this type in which the rotatable shaft has, in addition to stirring means, several helicoidal baffles which turn within a fixed tubular case, thus forming axial pumps which create various circulations of the solution inside the vat. One of these axial pumps has the effect of sending a current of solution into a pallet dispersion device projecting the solution by centrifugal force against obstacles, especially for mixing it thoroughly with additional water or other liquid, as well as for aerating the solution in order to extract volatile substances from it. This type of reaction vessel allows an entire series of treatments to take place on the cocoa solution, such as thermal, mechanical and chemical treatments to sterilize it and also to obtain various improvements in its rheological, chemical, gustatory and other properties.

However, this apparatus has various disadvantages. Aside from its complicated construction and the cumbersome helicoidal pumps attached to the shaft, the presence of a stationary tubular structure around the pumps, particularly between the shaft and the heating coils submerged in the cocoa solution, prevents the solution from being stirred effectively near the coils and thus limits heat transmission to them. Furthermore, pump speed is limited by the stirring devices and thus varies considerably with the viscosity of the solution. Finally, this entire pumping mechanism complicates cleaning the reaction vessel.

SUMMARY OF THE INVENTION

The goal of the present invention is to provide a reaction vessel designed to eliminate the disadvantages described above, capable of further improving the effectiveness of certain cocoa solution treatments in the reaction vessel.

To achieve this the invention concerns a reaction vessel of the type described in the preamble, characterized in that the pump for the circulation means is located outside the vat and is activated by drive means which are distinct from those for the rotatable shaft.

Preferably, the circulation means comprise a suction pipe connecting said vat outlet to the pump and a delivery pipe going from the pump to the inside of the vat, and means for introducing liquids into the solution are connected to said suction pipe. Said means for introducing liquids may comprise means for introducing water or aqueous solutions, and/or means for introducing air.

In a particular embodiment, the rotatable shaft comprises a central canal extending upward from the lower end of the shaft, the delivery pipe extends into said central canal, and the spray device is disposed on or in the shaft.

In this case, the spray device may be attached to a stationary axial tube forming the delivery pipe inside said central canal and may be located across from a series of lateral openings in the shaft. A conical plate may be coaxially attached to the rotatable shaft at an intermediate level between the spray device and said maximum level so that at least a portion of the sprayed solution falls onto this plate.

Preferably, the circulation means are connected on command by a first triple outlet valve to an evacuation pipe through which the solution may be evacuated from the vat by means of said pump.

In order to empty the vat easily, a particular embodiment provides for a reversible pump and provides that the first triple outlet valve be disposed on said suction pipe and that said delivery pipe traverse a base of the vat near a low point in the base and have orifices communicating with the inside of the vat which allow suction evacuation of materials deposited on said low point. Said suction pipe may have a second triple outlet valve situated between the vat outlet and the first triple outlet valve, said second valve being connected to the delivery pipe by a distributing pipe.

In a reaction vessel where the heating means consist, in known manner, of a coiled circuit for heat-transmitting liquid inside the vat, an advantageous embodiment provides that the heating means further comprise a circuit for heat-transmitting liquid situated against an exterior surface of a peripheral vat wall.

In addition, such a reaction vessel may have, in an annular space situated between the rotatable shaft and said coiled circuit, stirring means with angled arms, the end portions of which extend as far as the region of the coiled circuit.

Preferably said end portions of the angled arms are inclined from the vertical so as to create axial movement of the solution within said annular space.

BRIEF DESCRIPTION OF THE DRAWINGS

The present invention and its advantages will be more apparent from the following description of one exemplary embodiment, with reference to the attached drawings, in which.

DESCRIPTION OF THE PREFERRED EMBODIMENT

Figure 1:
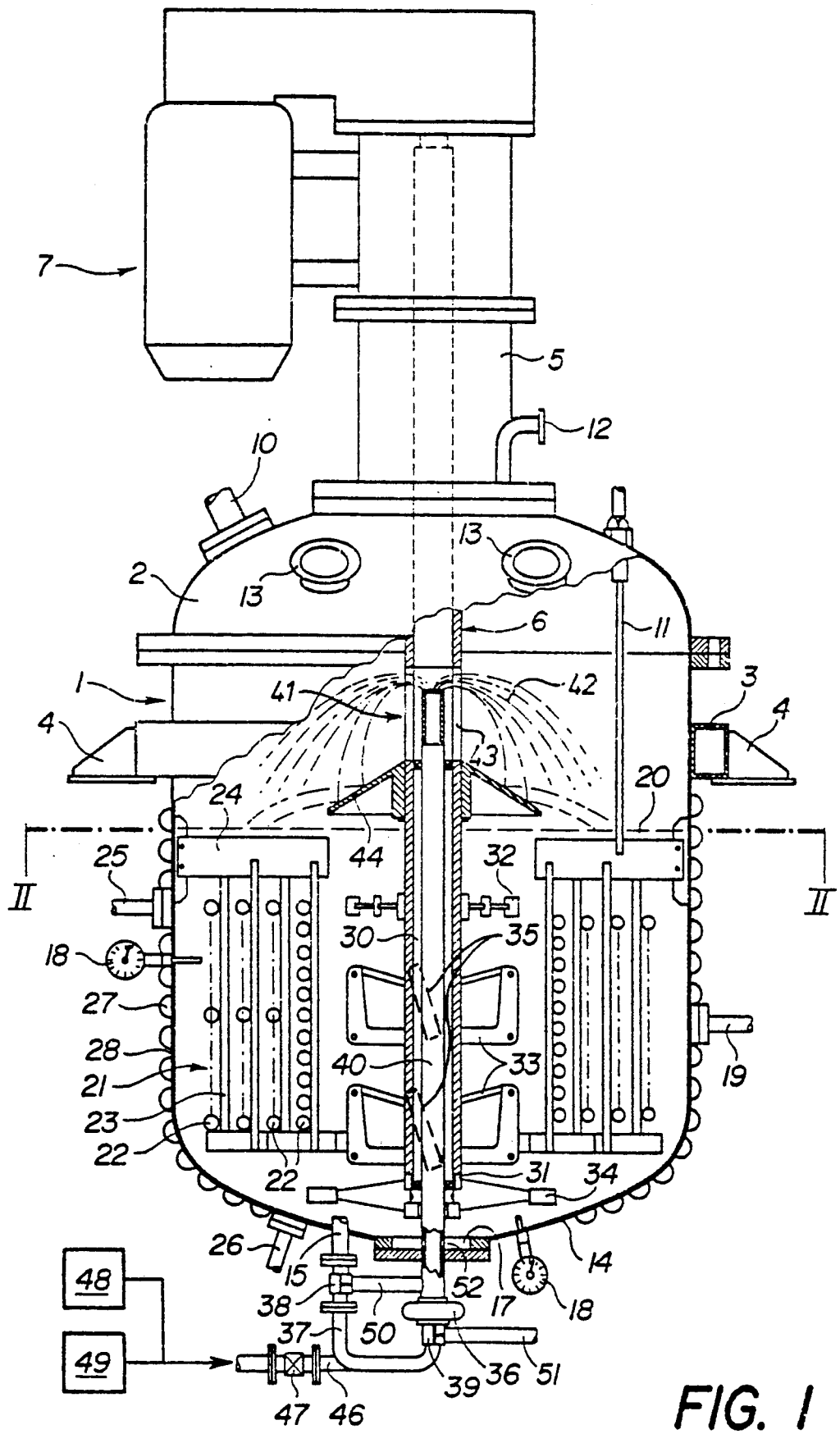
FIG. 1 is an elevation and partial axial cross-section of a particular embodiment of a reaction vessel according to the present invention.
Figure 2:
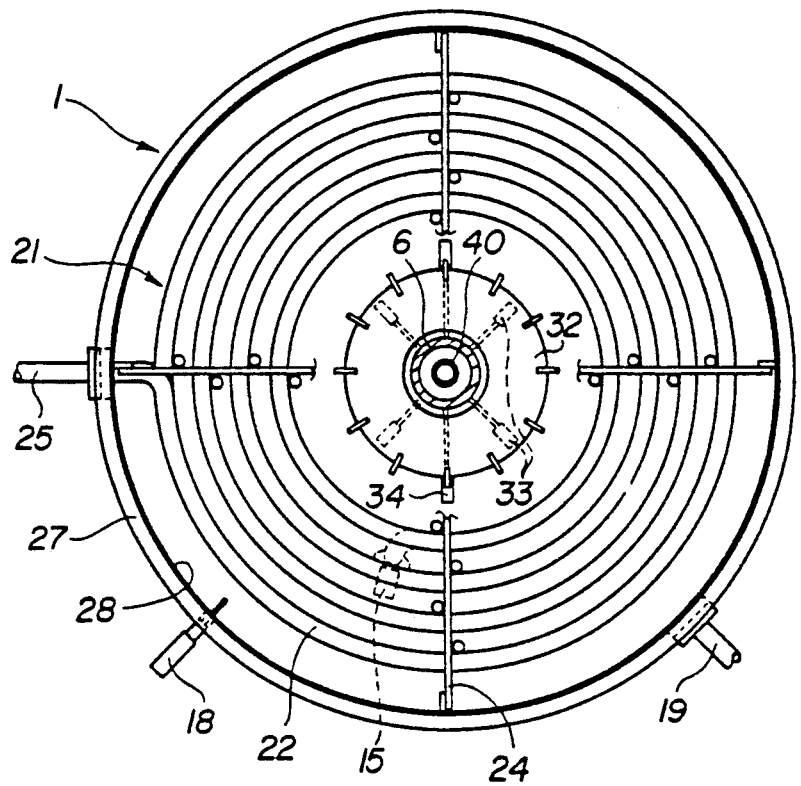
FIG. 2 is a schematic horizontal cross-section taken along line II—II of FIG. 1.

With reference to FIGS. 1 and 2, the reaction vessel comprises, in known manner, a metal vat 1 tightly sealed by an upper cover 2 and capable of undergoing both pressurizing and vacuum operations. The vat is provided with a peripheral support ring 3 with brackets 4 which transmit the weight of the reaction vessel to a framework, not shown. At the top of cover 2 a pivot support 5 is attached, holding on one side rotatable shaft 6 extending vertically to the center of vat 1, and on the other side a back-geared motor 7 disposed to control rotation of shaft 6. FIG. 1 also shows that cover 2 is equipped with different devices customary for this sort of reaction vessel, specifically an inlet connection 10 for filling vat 1 with cocoa solution to be treated, a level control probe 11, a connection 12 for connecting the vat to a vacuum pump, as well as observation windows 13 for visual control.

Vat 1 is generally cylindrical in shape with a concave base 14 provided with a solution outlet connection 15, as well as with a central vacuum chamber 17 which will be described hereinafter. In addition, the vat is equipped with various temperature probes 18 and with an outlet 19 for drawing off samples of solution.

Vat 1 is designed to be partially filled to a maximum level 20 controlled by probe 11 with a cocoa based mass in molten state generally called cocoa solution. In the vat this solution is heated (and cooled in certain cases) by means of a conventional circuit 21 of heat-transmitting fluid such as hot water or steam, said circuit consisting of several concentric rows of coils 22 held by vertical supports 23 and horizontal supports 24. This circuit enters the vat through inlet connection 25 and outlet connection 26. In the example shown, vat 1 has a second heating circuit formed by semi-circular pipes 27 attached to the outside surface of metal wall 28 of the vat. Naturally, a layer of thermal insulation may cover the outside of this circuit to form a heating envelope advantageously using the peripheral wall of the vat as a surface for heat exchange with the solution. The heat-transmitting fluid sent into this circuit may have a different temperature from that in the first circuit, for example, it may be lower to prevent substances contained in the solution from sticking to wall 28.

Rotatable shaft 6 is a hollow shaft comprising a central canal 30 and has one unattached end 31 in the region of base 14 of the vat. Below maximum level 20 various stirring devices 32, 33, 34 are attached to shaft 6 and by turning with it, create various stirring motions within the solution. Device 32 is disk shaped and has vertical or slanted peripheral pallets. Devices 33 are in the form of angled arms with an end portion 35 which passes near coils 23 so as to cause the solution to circulate fairly rapidly along them and avoid localized heating. These portions 35 may be slanted in relation to the vertical (which is not shown here) to cause the solution to flow down into the space situated between shaft 6 and the first row of coils 22 and then flow upward through the coils of circuit 21 and along heated peripheral wall 28. Stirring device 34 attached to free end 31 of the shaft is a centrifugal regulator of known type, contributing to adapting the rotation speed of the shaft to the viscosity of the solution being treated.

To make the solution circulate and project it into the upper portion of vat 1, that is, above maximum level 20, in order to place it in close contact with the air or other gases contained in the vat, the reaction vessel is provided with an exterior pump 36 with its own motor (not shown) and capable of being controlled so as to function independently of the rotation of shaft 6 and thus of the stirring devices. One side of the pump is connected to outlet connection 15 by a vacuum pipe 37 with two triple outlet valves 38 and 39. The other side of pump 36 is connected to a delivery pipe 40 formed of a stationary tube which traverses chamber 17 and base 14 of the vat and coaxially extends upward inside central pipe 30 of shaft 6. In the upper portion of vat 1 this tube has a spray head 41 with peripheral openings through which the pumped solution exits in umbrella-like spurts 42, through lateral openings 43 in shaft 6. At least a portion of spray 42 falls onto conical plate 44, from which the solution is sprayed for a longer distance. This spray device produces intense aeration of the pumped solution.

Suction pipe 37 has an inlet junction 46 with an anti-return valve 47 connected, as shown schematically in FIG. 1, to an air supply 48 and a water supply 49 consisting of appropriate measuring devices for water and other possible solutions of treatment products to be introduced into the cocoa solution. One particularly advantageous feature of this device is that all the products introduced through junction 46 are immediately mixed thoroughly with the cocoa solution through the mechanical effects by pump 36 and then of spray head 41. Suction pipe valve 38 is connected to the delivery pipe 40 by a distributing pipe 50 whose function will be apparent hereinafter. Triple outlet valve 39 is connected to an evacuation pipe 51 through which the cocoa solution may be transported further after treatment. The network of pipes thus formed is used as described with reference to FIGS. 3 and 4, in which the arrows indicate the direction of fluid circulation.

Figure 3:
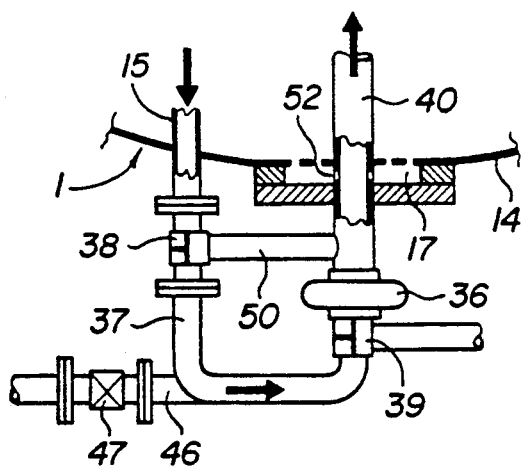
FIG. 3 is a detailed view analogous to FIG. 1, showing the functioning of a pumping mechanism which circulates the cocoa solution in the reaction vessel.

The example of FIG. 3 shows the normal circulation of cocoa solution suctioned from the vat by pump 36, through angled outlet connection 15 and suction pipe 37, to be sent into the vat as far as spray head 41 through delivery pipe 40. Because the pump may be controlled independently of the stirring devices, the corresponding solution treatments may be independently operated, simultaneously or in different phases, at speeds which may be respectively independent.

Figure 4:
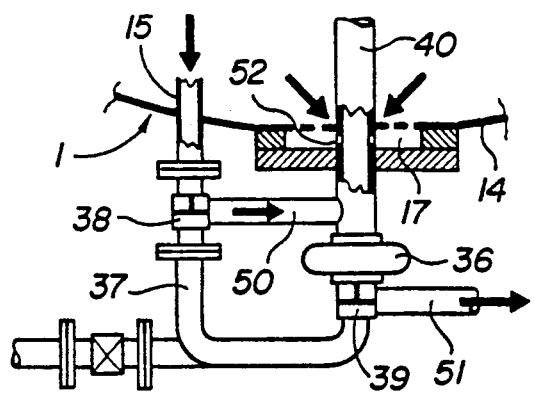
FIG. 4 is a view analogous to FIG. 3 illustrating the functioning of the pumping mechanism when used to empty the reaction vessel.

FIG. 4 shows how pump 36, which is a reversible type, may be used to evacuate cocoa solution from vat 1 when treatment is finished. Valve 38 is turned so as to connect outlet 15 to delivery pipe 40 via distributing pipe 50. Valve 39 is turned so as to connect the outlet of pump 36 with evacuation pipe 51. Thus, the cocoa solution is suctioned by the pump through outlet connection 15 and forced into pipe 51. At the same time, because lateral suction openings 52 are disposed in the wall of pipe 40 at the level of chamber 17, a little solution is suctioned from the vat into chamber 17, then through openings 52, taking with it the thicker substances which can be deposited in this low point of base 14 of the vat. In this way the vat can be completely and easily emptied.

Such a reaction vessel allows a wide range of known treatment operations to take place, specifically all the necessary treatment operations on the list provided above. The cocoa solution may be treated in a vacuum to extract disagreeable volatile substances from it and in a non-oxidizing atmosphere, such as nitrogen. The solution may be heated and maintained at a predetermined temperature to be pasteurized or sterilized for the desired length of time and may also be cooled by circulating cold liquid in the coils. Adding water, steam or alkaline solutions to the solution to de-acidify it is easy. By creating a vacuum, a certain quantity of water may be caused to evaporate. Finally, it is advantageous to ventilate the solution while it is being sprayed in thin sheets into the upper portion of the autoclave by means of air or a neutral gas which is evacuated by the vacuum pump.

The circulation device with an exterior, independent pump such as that described above has yet another specific advantage from the point of view of the processing method, by virtue of the fact that it allows a greater quantity of water to be added to the cocoa solution than is allowed with known apparatus. Until now this quantity was limited to about 4%, above which value the water produced gelling by binding with the cocoa starch. Due to the effects on the rheological properties of the solution of pump 36 working at high speed and due to the intense agitation achieved by the appropriate devices inside the vat, the reaction vessel according to the invention is capable of applying greater and better distributed mechanical energy to the liquid, so that it is possible to work with a high water content, with the maximum being from 6 to 8%. Now, increasing water content increases the effectiveness of sterilization. More precisely, it is known that each 1% of additional water has an effect equivalent to a virtual 7° C. increase in sterilization temperature. Therefore, if when sterilizing at 120° C., 2% supplementary water is added, the sterilization effect is the same as if working at 134° C. Thus, treatment is more effective and its length can be reduced.

The possibility of increasing water content is also advantageous for the operation of de-acidifying with the addition of an alkaline solution. Usually potassium carbonate is used, which should represent about 2% of solid cocoa. If the water content is limited to 4%, it is therefore necessary to use a highly concentrated solution, which creates the risk of saponification of the cocoa fat. In a reaction vessel according to the invention this well-known risk is greatly reduced because it is possible to increase the water content significantly. Furthermore, since this quantity of water will in large part be evacuated by vacuum evaporation in the reaction vessel, the secondary effect of this evaporation will be to extract from the solution a larger quantity of the volatile acidity it contains, specifically free acetic acid.

The present invention is not limited to the exemplary embodiment described above, but extends to any modification or variation obvious to one skilled in the art. In particular, it is noteworthy that delivery pipe 40 does not necessarily have to be located inside the rotatable shaft: it could be laterally mounted in the vat to terminate at the stationary spray devices which are completely independent of the shaft. In both cases, extracting the shaft upwardly for cleaning may be done easily without removing the spray devices.

I claim:

1. A reaction vessel for treating a cocoa solution and its derivatives, comprising:

a closed vat (1) having at least one inlet and one outlet for said solution, said vat having a maximum operating level (20) for said solution located intermediate a vat base portion and a vat portion remote from said base portion;

means (21) for heating said solution;

means (48, 49) for introducing a treatment fluid into said vat;

stirring means, for stirring said solution, comprising a rotatable shaft (6) positioned substantially vertically in said vat, a drive device (7) being drivingly connected to said rotatable shaft, and stirring members being supported by said rotatable shaft; and circulation means comprising at least one pump having a spray device (41) connected to an outlet of said pump, said spray device (41) being located between said vat portion remote from said base portion and said maximum operating level, and said pump being connected to said vat for pumping said solution from said base portion to said spray device, wherein said reaction vessel includes control means, separate from said drive device (7), and said pump (36) of said circulation means is located outside said vat (1) and is controlled by said control means.

2. A reaction vessel according to claim 1, wherein said circulation means further comprises a suction pipe (37) which interconnects said vat outlet with an inlet of said pump, and a delivery pipe (40) interconnects the outlet of said pump with said spray device, and said means (48, 49) for introducing a treatment fluid is connected to said suction pipe.

3. A reaction vessel according to claim 2, wherein said means (49) for introducing a treatment fluid comprises means for introducing one of water and an aqueous solution.

4. A reaction vessel according to claim 2, wherein said means (48) for introducing a treatment fluid comprises means for introducing air.

5. A reaction vessel according to claim 2, wherein said rotatable shaft has a central canal (30) extending from an end of said rotatable shaft located adjacent said base portion toward a remote end of said rotatable shaft, and said delivery pipe (40) and said spray device are located within said central canal.

6. A reaction vessel according to claim 5, wherein a stationary axial tube is located inside said central canal and forms said delivery pipe (40), a series of lateral openings (43) are formed in said rotatable shaft, and said stationary axial tube terminates adjacent said series of lateral openings (43) and is connected to said spray device.

7. A reaction vessel according to claim 6, wherein a conical plate (44) is coaxially mounted on said rotatable shaft at a location intermediate said spray device (41) and said maximum operating level (20) so that at least a portion of sprayed solution falls onto said conical plate (44).

8. A reaction vessel according to claim 2, wherein said circulation means is connected, by a first triple outlet valve (39), to an evacuation pipe (51) through which said pump (36) may evacuated said solutin from said vat.

9. A reaction vessel according to claim 8, wherein said pump (36) is reversible, and said first triple outlet valve (39) is connected to said suction pipe, and said delivery pipe traverses said vat near a low point of said base portion and comprises at least one orifice (52) which communicates with the interior of said vat to allow evacuation of said solution located adjacent the low point.

10. A reaction vessel according to claim 9, wherein said suction pipe (37) has a second triple outlet valve (38) located between said vat outlet (15) and said first triple outlet valve (39), and said second valve is connected to said delivery pipe by a distributing pipe (50).

11. A reaction vessel according to claim 1, wherein said heating means comprise a coiled circuit, located inside said vat, for transmitting a heated liquid (21) to said vat.

12. A reaction vessel according to claim 11, wherein said heating means further comprises a further circuit of a heat transmitting fluid (27) located against an outer surface of at least one exterior wall (28) of said vat.

13. A reaction vessel according to claim 11, wherein stirring devices (33) are located in an annular space situated between said rotatable shaft (6) and said coiled circuit (21).

14. A reaction vessel according to claims 13, wherein said stirring devices have angled arms, the end portions (35) of which extend toward said coiled circuit, and said end portions (35) are slanted, relative to the vertical direction, so as to create axial movement of said solution in said annular space.

* * * * *